(12) United States Patent
Desai

(10) Patent No.: US 6,288,656 B1
(45) Date of Patent: Sep. 11, 2001

(54) RECEIVE DESERIALIZER FOR REGENERATING PARALLEL DATA SERIALLY TRANSMITTED OVER MULTIPLE CHANNELS

(75) Inventor: Chintan Desai, Sunnyvale, CA (US)

(73) Assignee: LSI Logic Corporation, Milpitas, CA (US)

( * ) Notice: Subject to any disclaimer, the term of this patent is extended or adjusted under 35 U.S.C. 154(b) by 0 days.

(21) Appl. No.: 09/469,730

(22) Filed: Dec. 21, 1999

(51) Int. Cl.[7] ................................................... H03M 9/00
(52) U.S. Cl. ................................................ 341/100; 375/371
(58) Field of Search ............................... 341/100, 61, 141, 341/142, 143, 147, 165, 180, 173, 174, 50

(56) References Cited

U.S. PATENT DOCUMENTS

| | | | |
|---|---|---|---|
| 4,470,141 | * 9/1984 | Takada | 370/104 |
| 5,414,830 | * 5/1995 | Marbot | 395/500 |
| 5,793,822 | * 8/1998 | Anderson et al. | 375/371 |
| 5,864,592 | * 1/1999 | Itri | 375/375 |

* cited by examiner

*Primary Examiner*—Brian Young
*Assistant Examiner*—John Nguyen (57) ABSTRACT

A receive deserializer which regenerates parellel data words that have been broken into smaller data words and serially transmitted over multiple data channels uses an external state machine to shift word clocks with respect to data until the output of the channel last to receive a predefined data reference pattern is framed and provides storage to hold data for the channels which receive the reference pattern earlier.

40 Claims, 7 Drawing Sheets

RECEIVE DESERIALIZER FOR REGENERATING PARALLEL DATA SERIALLY TRANSMITTED OVER MULTIPLE CHANNELS

BACKGROUND OF THE INVENTION

1. Field of the Invention

The present invention is generally directed to transceiver applications involving transmitting and receiving parallel data. More specifically, the present invention is directed to receiving and regenerating parallel data words which have been broken into smaller data words and serially transmitted over multiple channels.

2. Background

Figure 1:
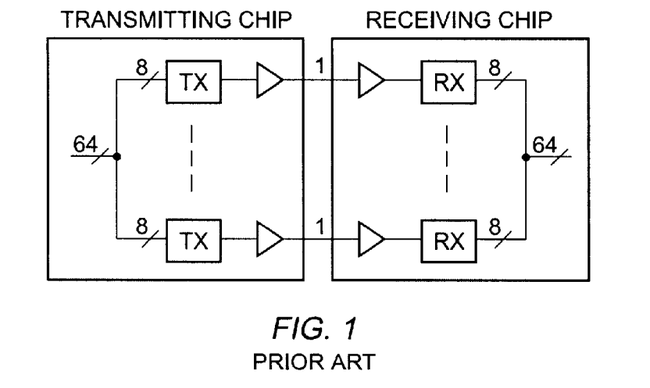
FIG. 1 is a block diagram of a typical sixty four bit transceiver illustrating the use of eight channels of eight bit transceivers in accordance with the prior art.

In many transceiver applications, large parallel data words such as sixty-four bit words are broken up on the transmitting chip into smaller parallel data words such as eight bit words. As illustrated in FIG. 1, the smaller parallel data words are then serially transmitted over multiple channels at a higher speed. Thus, the number of output pins on the transmit chip and input pins on the receive chip is reduced, for example, from sixty-four to eight. On the receiving chip, the high speed serial data is then appropriately deserialized to regenerate the original sixty-four bit word.

Although smaller parallel data words are being transmitted over multiple channels, on a system level the transceiver should function as a single-channel, sixty-four bit transceiver. To achieve this functionality, receivers in each of the higher speed channels recover clock based on the incoming serial data and generate eight bit parallel data words timed to a channel word clock. The word clock is a division of the recovered clock. The eight bit data words from each of the channels are then transferred from their own channel word clock domain to a single receiver clock domain to form the originally transmitted sixty-four bit data word. However, since the eight bit parallel data words travel on separate channels, the skew between these channels can create problems. The first problem involves aligning the eight bit parallel data words across parallel data channels so they are properly regrouped with other eight bit parallel words, and the second problem involves framing the serial data in each separate channel into eight bit parallel data words.

Figure 2:
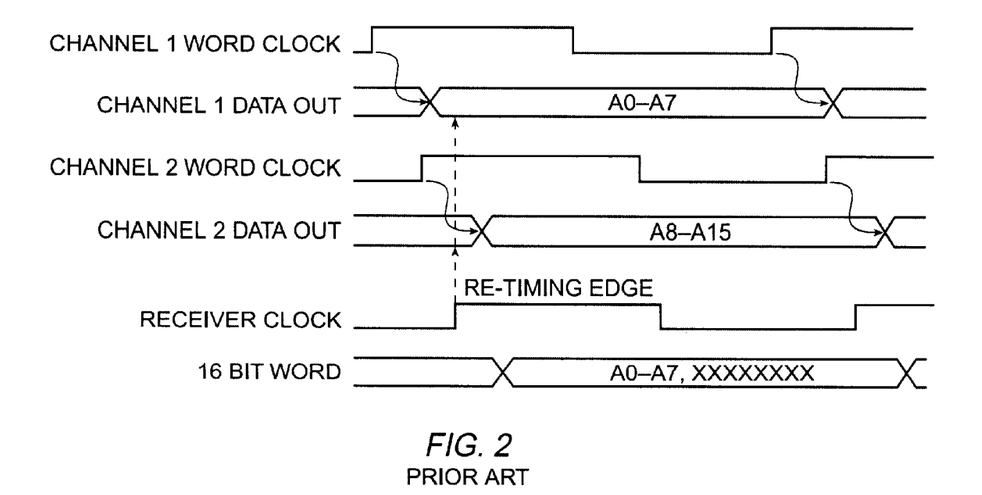
FIG. 2 is a timing diagram illustrating the problem of word alignment across multiple data channels using a two channel example in accordance with the prior.

The first problem encountered in regenerating parallel data words from multiple channels is word alignment across parallel data channels, which is generally illustrated by the timing diagram in FIG. 2. The timing diagram shows the problem of aligning data on the same clock edge across multiple channels using two channels as an example. A transmitter, breaks up a sixteen bit word into eight bit words A0–A7 and A8–A15 which are serialized and transmitted over channel one and channel two respectively. The receiver is supposed to regenerate the sixteen bit word on its own receiver clock. However, the channel one word clock and the channel two word clock on the two receive channels may not be exactly in phase, and the skew between the two channels may cause the wrong bits from channel two to be re-timed and grouped with the wrong bits from channel one. The timing diagram of FIG. 2 shows how the misalignment of received data and the out-of-phase channel word clocks between receive channels can cause an incorrect regrouping of the eight bit words from each channel. It is apparent from the diagram that in re-timing the eight bit word outputs from each channel, the re-timing edge of the receiver clock has missed the correct group of channel two data is bits, A8–A15, and has instead regenerated a sixteen bit word containing correct channel one data but erroneous channel two data.

Figure 3:
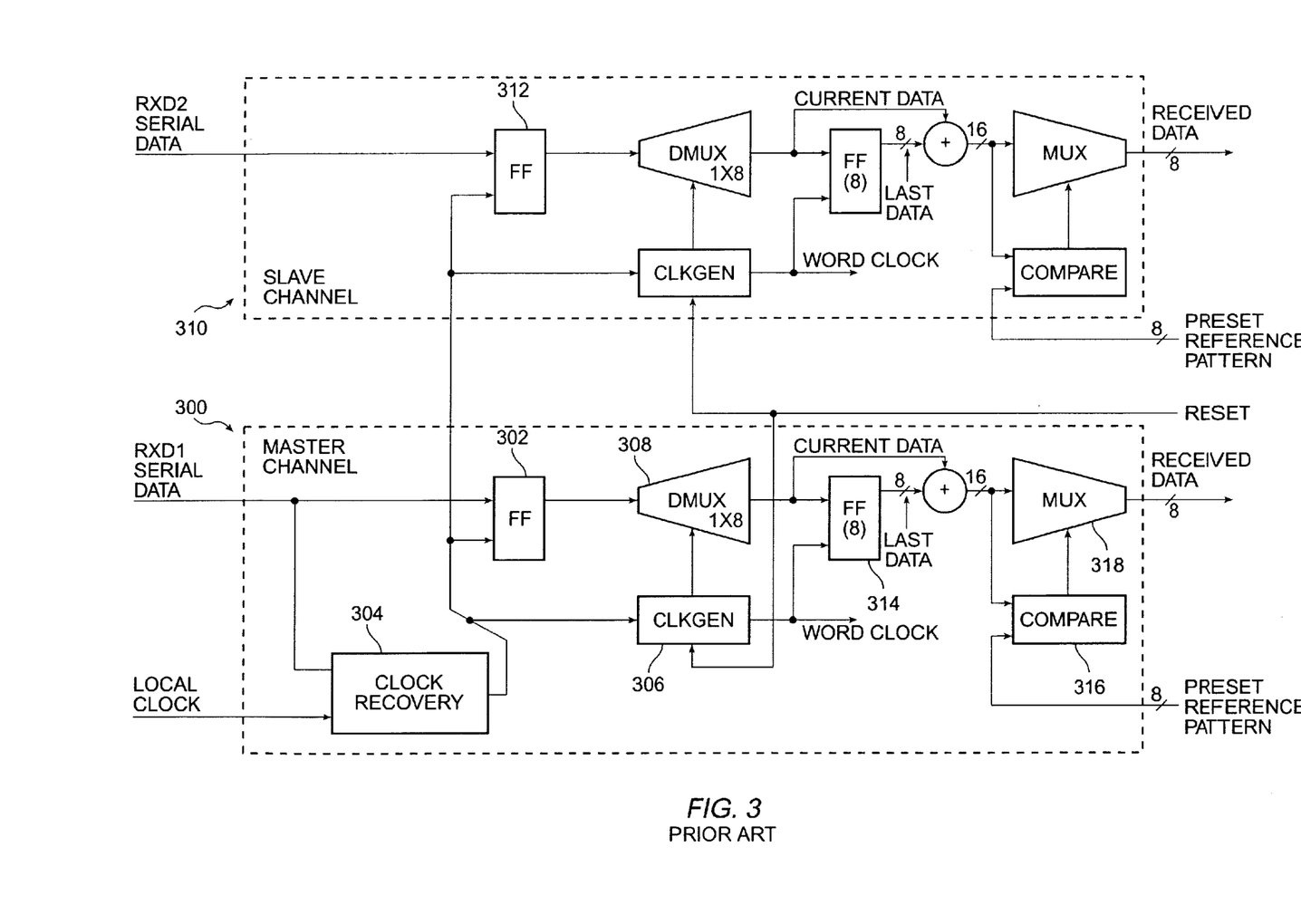
FIG. 3 is a block diagram illustrating a method for aligning parallel data words transmitted over multiple channels using slave channel architecture in accordance with the prior art.

Prior methods for solving the problem of aligning data words across multiple serial data channels include the use of slave channel architecture as illustrated by the block diagram of FIG. 3. The block diagram of FIG. 3 depicts a typical receive deserializer circuit using two serial data channels as an example. Briefly, in a typical single channel receive deserializer circuit as represented by the master channel 300 of FIG. 3, a sampling flip flop 302 receives serial data and samples it with the rising edge of the recovered clock. The recovered clock runs at the data rate frequency and is aligned to the serial data transition edge by a clock recovery module 304 so that all the sampling edges are in the middle of the data windows. The recovered clock is the source for eight phase clocks generated by a clock generator 306. The serial data is sampled by the eight phases to generate eight bits. The eight bits are finally re-timed on one of the phases, channel word clock to form a parallel data word.

In the multi-channel receive deserializer circuit which uses slave channel architecture to align data words across channels, as illustrated in the block diagram of FIG. 3, a single channel is chosen as the master channel 300. The master channel 300 performs clock recovery 304 using a local clock and serial data it receives. The recovered clock from the master channel 300 is then also used by the receivers in all the slave channels 310 to sample serial data input to each channel, thereby properly aligning all the sampled serial data across channels on the same clock edge.

Figure 4:
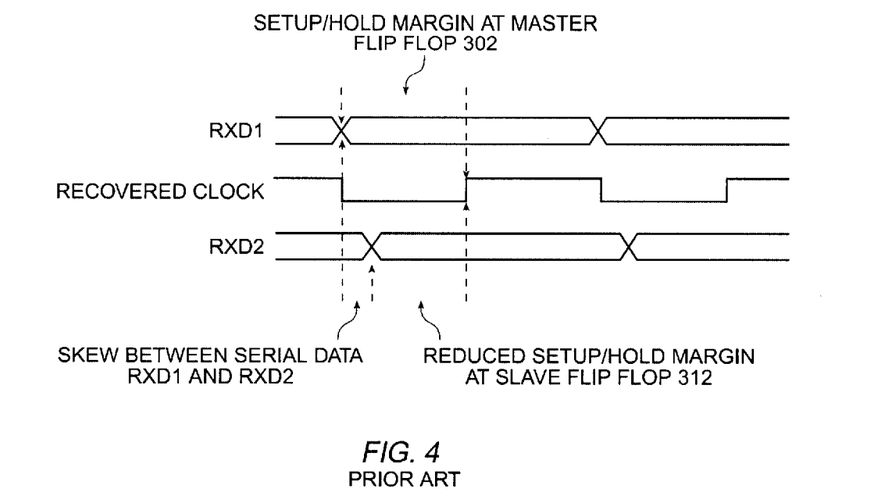
FIG. 4 is a timing diagram illustrating the effect of skew between data channels on setup/hold margins using slave channel architecture in accordance with the prior art.

However, the use of slave channel architecture to solve the problem of aligning data words across multiple serial data channels has limitations which often necessitate implementing rigorous and costly design standards when designing and fabricating these circuits. Using slave channel architecture requires that the skew between the serial data inputs across the channels be tightly controlled. The timing diagram of FIG. 4 illustrates the significant problem encountered when using the slave channel architecture of FIG. 3. Since the use of slave channel architecture employs just one clock recovery module 304 in a master channel 300 and uses the recovered clock to deserialize data in all the channels, any skew between serial data received in a slave channel 310 and serial data received in the master channel 300 directly reduces the setup/hold margin available at the slave channel 310 sampling flip flop 312. Rxd1 of FIG. 4 represents serial data input to the master channel 300 of FIG. 3. The clock recovery module 304 generates recovered clock by aligning the negative edge of the local clock with the data transition edge in order to ensure that a sufficient setup/hold margin exists at the master channel 300 sampling flip flop 302 when retiming the data with the positive edge of the recovered clock. However, as shown in the timing diagram of FIG. 4, the skew between the rxd2 serial data from the slave channel 310, and the rxd1 serial data from the master channel 300, reduces the net setup/hold margin at the slave channel 310 sampling flip flop 312 by the amount of skew. If sufficient skew exists between the master channel 300 and any slave channel 310, the result can be not enough setup/hold margin in the slave channel 310 to permit the sampling flip flop 312 to re-time the rxd2 serial data to the recovered clock from the master channel 300.

Once the serial data across the parallel data channels is aligned to the same clock, the second problem of framing the data into the proper parallel words in each channel must also be solved. When framing serial data into an eight bit parallel word in a single channel, a simple receiver deserializer demultiplexes sampled serial data and regenerates the eight bit parallel data words sent by a transmitter. However, the receiver has no information as to which bit of the eight bit parallel word is bit zero, the least significant bit (LSB), or which bit is bit seven, the most significant bit (MSB). Thus, information regarding the boundary of the eight bit parallel word has been lost in its transmission. The result is incorrectly framed parallel data words at the receiver which contain some bits belonging to the previous eight bit word or which contain some bits belonging to the next eight bit word.

Referring again to FIG. 3, the block diagram further illustrates a commonly used method for solving the data framing problem which will be discussed with reference to the master channel 300 only, as a single channel example. This prior method includes the use of additional storage elements to store the last received eight bit word in order to create a new sixteen bit word from the last word and the current word. The received serial data initially includes a predefined, eight bit data reference pattern and is retimed and aligned on the positive edge of the recovered clock by the master channel sampling flip flop 302. The demultiplexer 308 deserializes the retimed serial data into an eight bit parallel data word using a channel word clock from the clock generator 306. An array of eight storage flip flops 314 stores or effectively delays the eight bit word, which is then combined with the next or current eight bit word coming from the demultiplexer 308. A comparator 316 searches through the new sixteen bit word for the received reference pattern using its own preset reference pattern and identifies the location of the received reference pattern within the sixteen bit word to a sixteen-to-eight multiplexer 318. The sixteen-to-eight multiplexer 318 then selects these bits as the correct eight bits to be framed on the channel word clock and output as received data.

Figure 5:
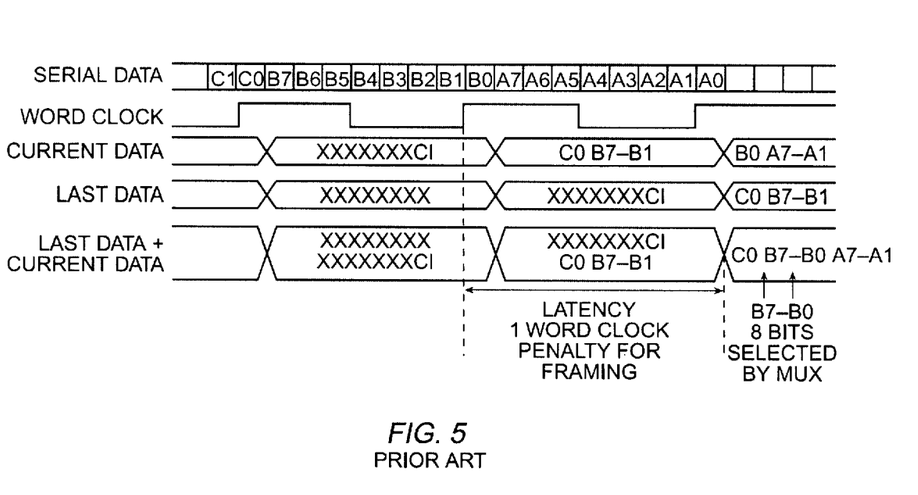
FIG. 5 is a timing diagram illustrating a method for framing parallel data in accordance with the prior art using a single channel of the deserializer circuit in FIG. 3 as an example.

The timing diagram of FIG. 5 further illustrates this prior method for framing parallel data as implemented by the single master channel 300 of FIG. 3. Where bits $B_7$–$B_0$ represent a received predefined reference pattern, the diagram indicates the combination of current and last data which forms a sixteen bit data word containing this received reference pattern. The bit locations of the reference pattern within the sixteen bit data word are found through multiple comparisons made by the comparator 316 of FIG. 3. Once located by the comparator 316, these bit locations are selected by the multiplexer 318 as containing the correct eight bits to be framed on the channel word clock and output as received data.

This and other prior methods of framing parallel data in single data channels can present significant costs in time and materials. For example, it is apparent from the timing diagram of FIG. 5 that framing parallel data by the method presented in FIG. 3, introduces unwanted latency. There is a necessary penalty of one word clock associated with this prior method of forming a sixteen bit data word to locate the predefined eight bit reference pattern.

Figure 6:
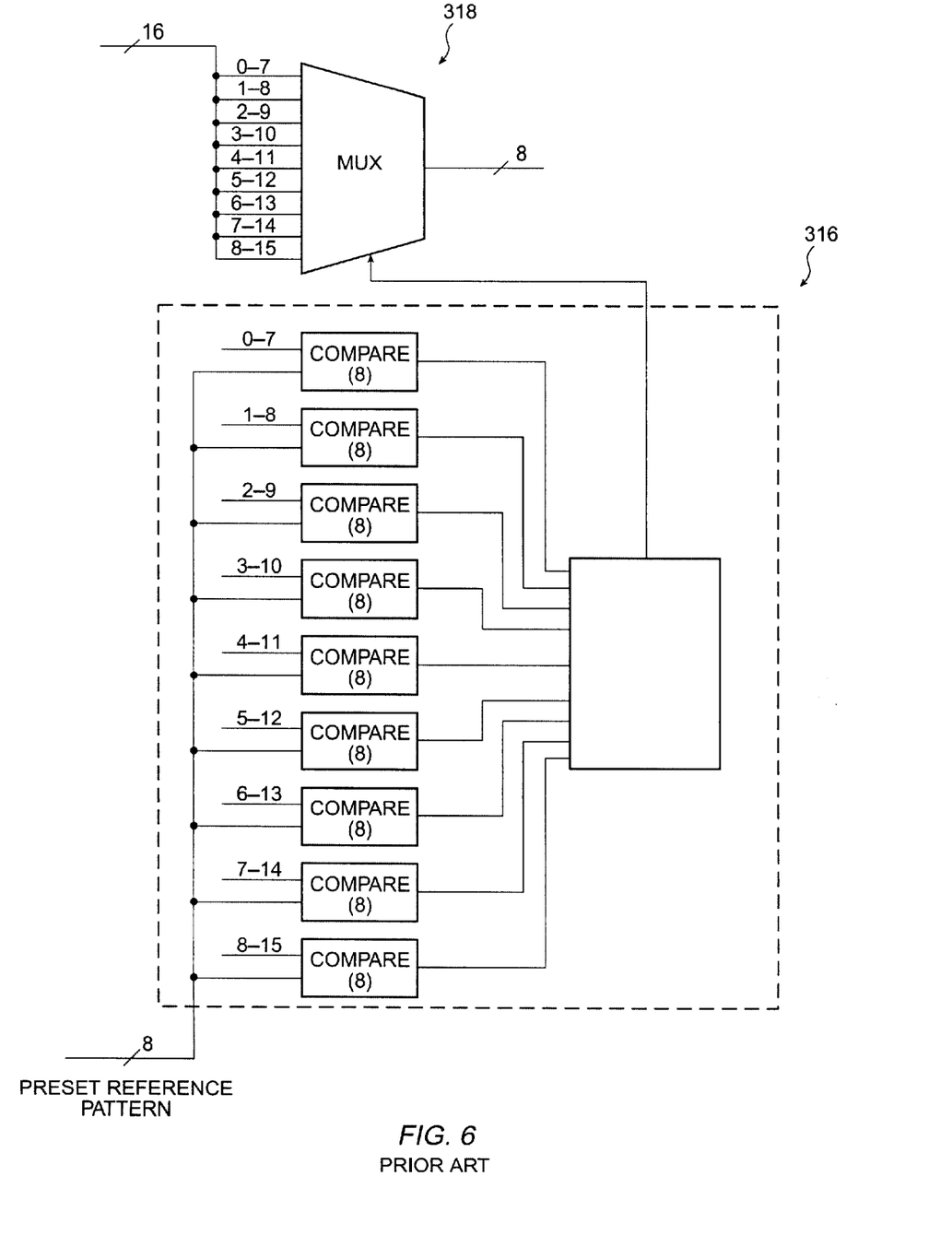
FIG. 6 is a diagram of the multiplexer and comparator portions of the deserializer circuit of FIG. 3 in accordance with the prior art, illustrating the complexity of implementing the comparator.

Additionally, increased scrutiny of the block diagram circuit of FIG. 3 indicates the complexity of the circuitry required to implement the prior framing method, as illustrated in FIG. 6. A circuit framework for the multiplexer 318 and comparator 316 blocks of FIG. 3 is presented in FIG. 6. Though not intended as a complete representation of these circuit blocks, the depiction in FIG. 6 shows the significant hardware required to implement the comparator 316 block of FIG. 3. Nine different sets of bit locations exist within the sixteen bit word where the predefined eight bit reference pattern might be encountered. For example, the predefined eight bit reference pattern could be located in bit locations 0–7, 1–8, 2–9, 3–10, 4–11, 5–12, 6–13, 7–14, or 8–15. It is therefore necessary to dedicate nine sets of eight comparators each, typically operational amplifiers or logic gates, to search these locations in order that the multiplexer 318 can select the correct location for framing the parallel data.

The disadvantages apparent in this and other prior methods of regenerating parallel data words from multiple channels therefore include the costs related to both aligning data across multiple data channels and framing the data within each channel. The use of prior slave channel architecture to solve the problem of aligning data words across multiple serial data channels requires that the skew between the serial data inputs across the channels be tightly controlled which necessitates the use of rigorous and costly design standards when designing and fabricating circuits. The use of the prior methods of framing parallel data create costs which include requirements for additional data storage elements, complex comparator and multiplexer circuits, and unwanted latency inherent to these methods.

Accordingly, there exists a need for an efficient, simple and low latency method for regenerating parallel data words in a deserializer circuit which have been broken up and serially transmitted across multiple data channels.

SUMMARY OF THE INVENTION

A receive deserializer which regenerates parallel data words that have been broken into smaller data words and serially transmitted over multiple data channels uses an external state machine to shift word clocks with respect to data until the output of the channel last to receive a predefined data reference pattern is framed and provides storage to hold data for the channels which receive the reference pattern earlier. Each data channel in the receive deserializer samples serial data and deserializes the data into parallel data words timed to a channel word clock from a clock generator. A number of bits of each data word are delayed and summed with the most current data word to make up a larger data word. A comparator locates bit positions within the larger data word that contain the reference pattern and sends a select indicator to a multiplexer which selects the correct bits for output. A state machine generates a shift pulse to the clock generator in each channel each time any comparator fails to match a location for the reference pattern. The clock generators disable all phases of the clock for one bit period each time they receive a shift pulse, effectively shifting alignment of the parallel data word being generated on the word clock in the demultiplexer. When all comparators produce a match, the reference pattern is selected by the multiplexer in each channel and all subsequent data words in each channel generated on their respective channel word clock are framed. The data words from each channel are then re-timed from their respective word clock domains to a single receiver clock domain to regenerate the original parallel data word.

DETAILED DESCRIPTION OF THE INVENTION

Those of ordinary skill in the art will realize that the following description of the present invention is illustrative only and not in any way limiting. Other embodiments of the invention will readily suggest themselves to such skilled persons after a perusal of this disclosure.

Figure 7:
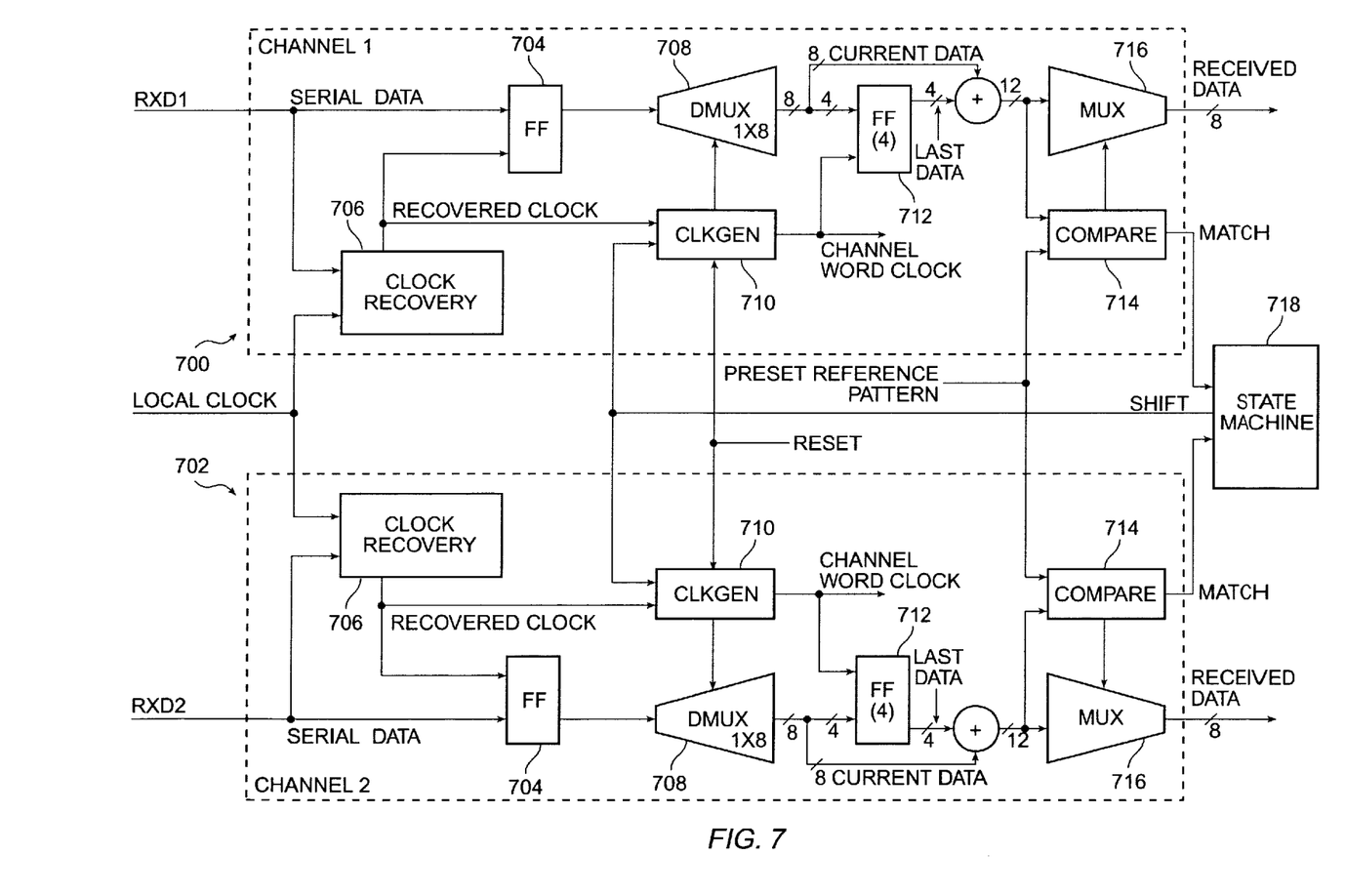
FIG. 7 is a block diagram illustrating a receive deserializer with parallel architecture in accordance with a preferred embodiment of the present invention.

A preferred embodiment of the present invention is illustrated in the block diagram of FIG. 7. The block diagram of FIG. 7 depicts a receive deserializer in parallel architecture which regenerates parallel data words that have been broken up into smaller data words and serially transmitted across multiple channels by aligning and regrouping the smaller data words. Although the diagram of FIG. 7 illustrates by way of example, only two data channels, channel one 700 and channel two 702, the present invention can be implemented in transceivers using any number of parallel data channels and most typically would be implemented in transceivers transmitting over eight parallel data channels.

Referring now to the receive deserializer circuit of FIG. 7, each channel of the multi-channel deserializer comprises a sampling flip flop 704 which receives serial data from a transmitter circuit (not shown). The serial data includes a predefined data reference pattern which is transmitted from the transmitter upon initialization of the circuit. The data reference pattern is typically, but not necessarily, an eight bit word. The sampling flip flop 704 re-times the serial data to a recovered clock. The recovered clock is a clock which is local to the receiver circuit and is aligned on its negative edge with the transition edge of the incoming serial data by a clock recovery module 706 present on each channel. The positive edge of the recovered clock is used to sample the data.

A clock generator 710 divides down the recovered clock and generates eight phase clocks at a frequency eight times slower than the recovered clock. One of the phase clocks is word clock. The serial retimed data is sampled by each phase clock to generate eight bits which are retimed with word clock as parallel data by a demultipler 708.

Each channel has flip flop storage elements 712 to delay a number of bits of the currently framed eight bit word. The number of bits delayed depends on the application and is based on the expected skew between data on the channels for a particular application. Each delayed bit adds a flip flop storage element 712. A typical number of bits to be delayed would be four bits where the maximum data skew expected between the data channels is four bits. Using four delayed bits as an example, the delayed data, or last data (See FIG. 7), is summed with the current data, the current eight bit word, thereby generating a twelve bit word. A comparator 714 searches the twelve bit word for the predefined data reference pattern transmitted upon initialization of the circuit and generates a select indicator to a multiplexer 716 to select the appropriate bits for output when a match occurs. The comparator 714 also generates a match indicator to an external state machine 718 each time the predefined data reference pattern is matched within the twelve bit word. The comparator 714 uses a preset reference pattern to compare against the twelve bit word in order to locate the predefined data reference pattern. The preset reference pattern is typically, but not necessarily generated through a set of hard wire connections to each comparator 714.

The external state machine 718 is singular with respect to the multiple channels and generates a shift pulse to the clock generators 710 in each channel every time any comparator 714 from any of the multiple channels does not generate a match indicator. When the clock generator 710 receives the shift pulse, it disables all the phase clocks by one bit period. This results is a one bit shift in the clocks with respect to the serial data and a bit shift in the parallel data generated on word clock in the demultiplexer 708. Since the last data, the delayed four bits, comprises part of the twelve bit word being compared in each comparator 714, this shifting technique ensures that comparators 714 which generate a match early, continue to match as the predefined reference pattern shifts one bit position at a time into higher bit positions within the twelve bit word. Therefore, comparators 714 which generate a match will continue to generate a match until all the comparators 714 generate a match. When all comparators 714 generate a match, the multiplexers 716 from each channel select the appropriate eight bits for output as received data on each channel.

Figure 8:
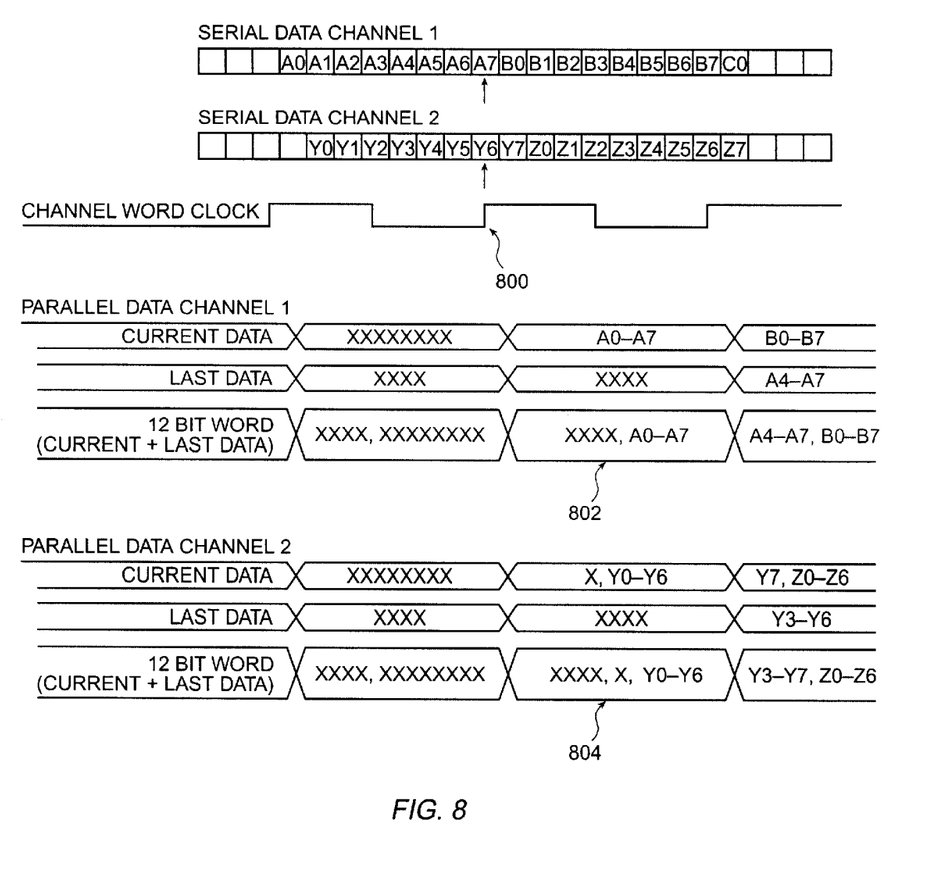
FIG. 8 is a timing diagram, which, in conjunction with the timing diagram of FIG. 9, illustrates the sequence of data in data channels of a receive deserializer in accordance with a preferred embodiment of the present invention.
Figure 9:
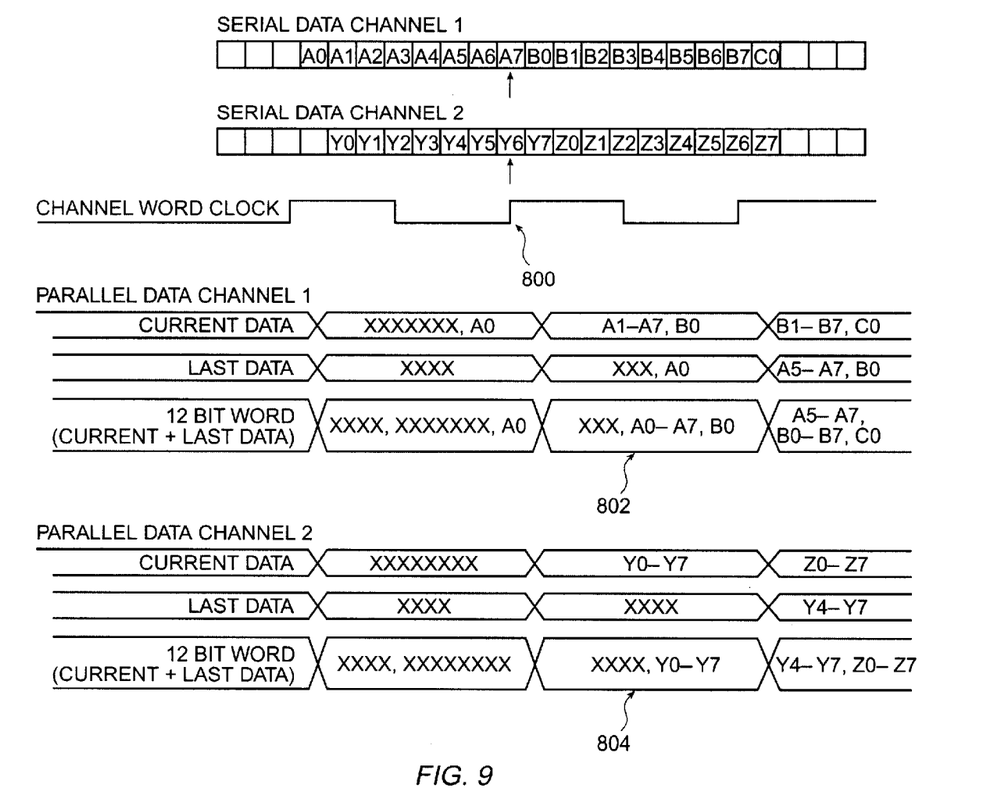
FIG. 9 is a timing diagram, which, in conjunction with the timing diagram of FIG. 8, illustrates the sequence of data in data channels of a receive deserializer in accordance with a preferred embodiment of the present invention.

The timing diagrams in FIGS. 8 & 9 demonstrate the sequence of data in the two data channels 700, 702 depicted in FIG. 7. The diagrams illustrate how the incoming serial data to both channels is framed with respect to a channel word clock as parallel data for output. The parallel data depicted in FIGS. 8 & 9 for both channels includes the current data and the last data as indicated by FIG. 7, as well as the twelve bit words which are the sum of the current and last data for each channel. These timing diagrams assume for the purpose of example, that the channel word clocks in each channel are in phase. Therefore, only one channel word clock is illustrated in the timing diagrams of FIG. 8 and FIG. 9.

Referring first to the timing diagram of FIG. 8, channel one is receiving serial data B7–B0, A7–A0, and so on, while channel two is receiving serial data Z7–Z0, Y7–Y0, and so on. In addition, bits B7 and Z7 were serialized at the transmitter and transmitted at the same time. Similarly, bits B0 and Z0, A7 and Y7, A0 and Y0, and the respective pairs of bits in between, all came out of the transmitter at the same time. Therefore, on the sampling edge 800 of a given word clock, channel one should frame bits A7–A0 as output, since these bits should appear within the twelve bit word 802 (the sum of current data and last data) for channel one, and channel two should frame bits Y7–Y0 as output, since these bits should appear within the twelve bit word 804 for channel two. It is apparent from the timing diagram of FIG. 8 that the twelve bit word 802 for channel one contains bits A7–A0. However, the channel two data is not properly framed, and the twelve bit word 804 for channel two does not contain bits Y7–Y0. Therefore, alignment of the outputs of these two channels, if not corrected, would regenerate a parallel word containing the correct bits from channel one but the incorrect bits from channel two, making transmission of the parallel word faulty.

Referring now to the timing diagram of FIG. 9, it is evident how the framing method of the present invention which delays channel word clocks while storing prior data bits results in proper alignment of words across multiple data channels in regenerating parallel data words. Although bits B7 and Z7, B0 and Z0, A7 and Y7, A0 and Y0, and the respective pairs of bits in between were serialized at the transmitter and transmitted at the same time, it is apparent from the timing diagrams of FIGS. 8 & 9 that the serial data in channel two arrived one bit period earlier than the serial data in channel one. Therefore, delaying the channel word clock by one bit period as shown in FIG. 9, moves the sampling edge 800 of the channel word clock such that the desired bits Y7–Y0 on channel two now appear within the twelve bit word 804, whereas these bits failed to appear within the twelve bit word 804 prior to delaying the channel word clock as illustrated in FIG. 8. Furthermore, it is apparent that the desired bits A7–A0 on channel one still appear within the twelve bit word 802 due to the storage of prior data bits in storage flip flops 712 shown in the block diagram of FIG. 7. Therefore, upon circuit initialization where bits A7–A0 on channel one and bits Y7–Y0 on channel two represent the predefined data reference pattern searched for by the comparators 714, matches would occur in both channels after delaying channel word clock only one bit period, and the multiplexers 716 would select these bits as the proper output bits for the respective channels based on select indicators from the comparators 714.

The timing diagrams of FIGS. 8 & 9 further illustrate the benefit of reduced latency in the method of the present invention for framing data between multiple channels. Since the channel word clock needs to be shifted by only enough bit periods to align data in the channel which is most delayed, the latency penalty is dependent on the skew between serial data across the channels. In our example where the maximum expected skew between serial data across the channels is four bits, the worst case latency penalty can be four bit periods. Again, the expected skew between serial data across data channels depends on the application, and the number of bits to be delayed and the number storage flip flops 712 required therefore may vary between applications. The latency penalty would vary accordingly. Prior methods of framing parallel data, as indicated by the timing diagram of FIG. 5, introduce a necessary penalty of one whole word clock.

After framing and aligning the data words across channels, the last step in regenerating the originally transmitted parallel data word is to re-time the data words across the channels into a single clock domain. In the timing diagrams of FIG. 8 and FIG. 9, the assumption is made that the channel word clocks are in phase. In reality though, the word clocks between channels could be skewed. The source of the word clock for each channel is the recovered clock, which is aligned with the transition edge of the serial data for that channel. The word clock between channels can therefore be skewed by plus or minus one-half of a bit period based on the skew between the serial data inputs of each channel. In addition, if the clock generators 710 (see FIG. 7) are not reset at exactly the same time, the word clocks in different channels can be skewed by one bit period, or one recovered clock period. Therefore, the recovered clocks from one channel to another could be skewed by two bit periods.

Figure 10:
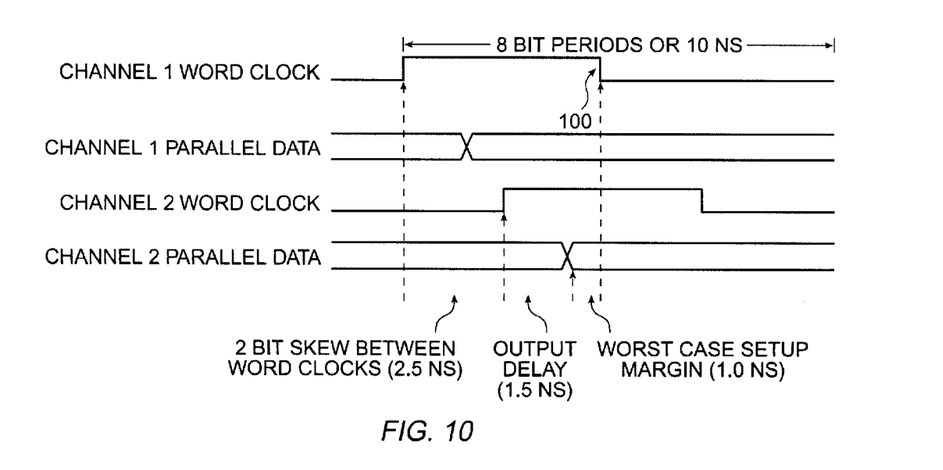
FIG. 10 is a timing diagram illustrating sufficient setup time for re-timing parallel data words across channels into a single clock domain under a worst case scenario of skew between channels in a receive deserializer in accordance with a preferred embodiment of the present invention.

However, the timing diagram of FIG. 10 illustrates that under the worst case scenario of skew between channels, the method of the present invention for framing and aligning data between multiple channels permits re-timing of the is parallel data words across all channels into a single clock domain using the negative edge of any of the channel word clocks. As shown in the timing diagram of FIG. 10, the word clock in channel two is skewed by the maximum amount of two bit periods. The negative edge 100 of channel one word clock is used to align the data words in this worst case scenario. The net setup margin to re-time parallel data out of channel two with the channel one word clock will be two bit periods. At a targeted data rate of 600 to 800 megabits per second, each bit period is at least 1.25 nanoseconds so that two bit periods is approximately 2.5 nanoseconds. The output delay of 1.5 nanoseconds includes a combination of delay from flip flops, the comparator and the multiplexer. As can be seen from the diagram, the combined two bit period skew and output delay still leave 1.0 nanosecond of setup margin to safely re-time parallel data out of channel two with the negative edge 100 of channel 1 word clock.

The benefits of the method and parallel architecture of the present invention over prior methods and implementations are significant. There is a reduced need for flip flop storage elements, complex comparators, and sixteen-to-eight multiplexers, which is clear when comparing the prior methods illustrated in FIGS. 3 & 6 with the method of the present invention illustrated in FIG. 7. Furthermore, framing parallel data by prior methods such as illustrated in FIG. 3, introduces unwanted latency. While the latency associated with the method of the present invention is dependent on the skew between serial data across multiple channels, as illustrated in the timing diagrams of FIGS. 8 & 9, prior methods such as those illustrated by the timing diagram of FIG. 5, introduce a necessary penalty of one word clock.

Alternative Embodiments

While embodiments and applications of this invention have been shown and described, it would be apparent to those skilled in the art having the benefit of this application that many more modifications than mentioned above are possible without departing from the inventive concepts herein. The invention, therefore, is not to be restricted except in the spirit of the appended claims.

What is claimed is:

1. A receive deserializer circuit for aligning serially transmitted data words from two or more data channels, each of said two or more data channels comprising:

a clock recovery module which aligns a local clock with serial data, generating a recovered clock;

a clock generator connected to the output of said clock recovery module;

a sampling flip flop which re-times said serial data to said recovered clock;

a demultiplexer connected to the output of said sampling flip flop;

a storage device connected to the output of said demultiplexer;

a summing device connected to the output of said demultiplexer and the output of said storage device;

a multiplexer connected to the output of said summing device;

a comparator connected to the output of said summing device; and a state machine, external to said two or more data channels and connected to said comparator and said clock generator in each of said two or more data channels.

2. The circuit as recited in claim 1, wherein said serial data includes a data reference pattern.

3. The circuit as recited in claim 2, wherein said data reference pattern is an eight bit data reference pattern.

4. The circuit as recited in claim 1, wherein said clock generator generates clock phases including a channel word clock, said recovered clock being the source clock for said clock phases.

5. The circuit as recited in claim 4, wherein said serial data is sampled by each of said clock phases and deserialized into a parallel data word timed to said channel word clock.

6. The circuit as recited in claim 5, wherein said storage device delays a number of bits of said parallel data word as last data.

7. The circuit as recited in claim 6, wherein said summing device sums said parallel data word with said last data, generating a larger data word.

8. The circuit as recited in claim 7, wherein said comparator makes a comparison between said larger data word and a preset data reference pattern.

9. The circuit as recited in claim 8, wherein said comparator generates a select indicator and a match indicator when said comparison results in a match.

10. The circuit as recited in claim 8, wherein said preset data reference pattern is derived from a plurality of hard-wired connections.

11. The circuit as recited in claim 8, wherein said preset data reference pattern is derived from data received from a transmitter upon initialization of said circuit.

12. The circuit as recited in claim 9, wherein said multiplexer selects eight bits of said larger data word as output based on said select indicator.

13. The circuit as recited in claim 9, wherein said state machine generates a shift pulse following each of said comparisons which does not result in a match indicator from all comparators in said two or more data channels.

14. The circuit as recited in claim 13, wherein said clock generator in each of said two or more data channels disables said clock phases for a period of one bit upon receipt of said shift pulse, thereby creating a one bit shift in the alignment of said parallel data word being generated on said word clock in said demultiplexer.

15. The circuit as recited in claim 6, wherein said number of bits is four bits.

16. The circuit as recited in claim 15, wherein said summing device sums said parallel data word with said last data, generating a twelve bit word.

17. The circuit as recited in claim 16, wherein said comparator makes a comparison between said twelve bit word and a preset data reference pattern.

18. The circuit as recited in claim 17, wherein said comparator generates a select indicator and a match indicator when said comparison results in a match.

19. The circuit as recited in claim 17, wherein said preset data reference pattern is derived from a plurality of hard-wired connections.

20. The circuit as recited in claim 17, wherein said preset data reference pattern is derived from data received from a transmitter upon initialization of said circuit.

21. The circuit as recited in claim 18, wherein said multiplexer selects eight bits of said larger data word as output based on said select indicator.

22. The circuit as recited in claim 18, wherein said state machine generates a shift pulse following each of said comparisons which does not result in a match indicator from all comparators in said two or more data channels.

23. The circuit as recited in claim 22, wherein said clock generator in each of said two or more data channels disables said clock phases for a period of one bit upon receipt of said shift pulse, thereby creating a one bit shift in the alignment of said parallel data word being generated on said word clock in said demultiplexer.

24. The circuit as recited in claim 1, wherein said comparator is a plurality of comparators selected from the group consisting of operational amplifiers, logic gates and combinations thereof.

25. A method of aligning serially transmitted data words from two or more data channels in a receive deserializer circuit, comprising the steps of:

generating a recovered clock by aligning a local clock with serial data in each of said two or more data channels;

generating clock phases including a channel word clock in each of said two or more data channels;

receiving said serial data including a data reference pattern and re-timing said serial data to said recovered clock in each of said two or more data channels;

deserializing said serial data into a parallel data word timed to said channel word clock in each of said two or more data channels;

delaying a number of bits of said parallel data word as last data in each of said two or more data channels;

summing said last data and said parallel data word as a larger data word in each of said two or more data channels;

comparing said larger data word with a preset data reference pattern in each of said two or more data channels;

generating a shift pulse when said comparing does not result in a match in all of said two or more data channels;

disabling said clock phases for a period of one bit each time said shift pulse occurs, thereby creating a one bit shift in the alignment of said parallel data word being generated on said channel word clock;

generating a match signal and a select indicator in each of said two or more data channels when said comparing results in a match;

selecting those bits indicated by said select indicator as received data in each of said two or more data channels; and aligning said received data from each of said two or more data channels with a single word clock selected from all word clocks in each of said two or more data channels.

26. The method as recited in claim 25, wherein said data reference pattern is an eight bit data reference pattern.

27. The method as recited in claim 25, wherein said recovered clock is the source clock for said channel word clock.

28. The method as recited in claim 25, wherein said delaying is performed by flip flops.

29. The circuit as recited in claim 25, wherein said preset data reference pattern is derived from a plurality of hard-wired connections.

30. The circuit as recited in claim 25, wherein said preset data reference pattern is derived from data received from a transmitter upon initialization of said circuit.

31. The method as recited in claim 25, wherein said parallel data word is eight bits long.

32. The method as recited in claim 25, wherein said number of bits is four bits.

33. The method as recited in claim 25, wherein said larger data word is a twelve bit data word.

34. A receive deserializer circuit for deserializing a serially transmitted data stream from two or more data channels, wherein the data stream comprises a plurality of data words of a certain word length, each of said two or more data channels comprising:

a channel word clock generator for generating a channel word clock;

a storage element for storing a portion of a previous data word, wherein such portion consists of fewer bits than the word length;

a selector circuit coupled to the storage element and coupled to receive a current data word that immediately succeeded the previous data word in the data stream, such that the selector circuit receives a data string comprising the current data word concatenated with the portion of the previous data word, the selector circuit configured to compare a reference word with different portions of the concatenated data string and select a particular portion of the third plurality of bits that matches the reference word;

wherein the storage element and selector circuit are coordinated with one another according to the channel word clock.

35. The receive deserializer circuit of claim 34 wherein the word length is eight bits.

36. The receive deserializer circuit of claim 35 wherein the first plurality of bits consists of four bits.

37. The receive deserializer circuit of claim 34 wherein the word length is eight bits.

38. The receive deserializer circuit of claim 34 wherein the selector circuit comprises a compare circuit coupled to a multiplexer.

39. The receive deserializer circuit of claim 34 wherein the channel word clock generator comprises:

a clock recovery module for generating a recovered clock that is aligned on its negative edge with the transition edge of data bits within the data stream; and a clock generator coupled the recovered clock to generate the channel word clock.

40. The receive deserializer circuit of claim 39 further comprising:

a flip flop that samples and re-times the data stream to the recovered clock to create re-timed date; and a demultiplexer coupled to receive the re-timed data and coupled to the clock generator such that the demultiplexer provides the current data word, wherein the storage element is coupled to the demultiplexer such that it receives a portion of the current data word, and wherein the storage element is timed by the word clock such that the storage element stores the portion of the current data word for a word clock cycle, thereby delaying the portion such that it becomes a portion of a previous data word.

* * * * *